United States Patent
Lee et al.

(10) Patent No.: US 9,195,624 B2
(45) Date of Patent: Nov. 24, 2015

(54) APPARATUS AND METHOD FOR TRANSMITTING AND RECEIVING DATA IN A DATA COMMUNICATION SYSTEM

(71) Applicant: Samsung Electronics Co., Ltd., Gyeonggi-do (KR)

(72) Inventors: One-Gun Lee, Seoul (KR); Woo-Jong Yoo, Gyeonggi-do (KR); Hyun-Ho Park, Seoul (KR); Ju-Pyo Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/098,799

(22) Filed: Dec. 6, 2013

(65) Prior Publication Data

US 2014/0164656 A1 Jun. 12, 2014

(30) Foreign Application Priority Data

Dec. 6, 2012 (KR) ........................ 10-2012-0141283

(51) Int. Cl.
*G06F 13/10* (2006.01)
*G06F 13/38* (2006.01)

(52) U.S. Cl.
CPC ............ *G06F 13/385* (2013.01); *G06F 13/102* (2013.01); *G09G 2370/12* (2013.01)

(58) Field of Classification Search
None
See application file for complete search history.

(56) References Cited

U.S. PATENT DOCUMENTS

| 6,198,499 B1 * | 3/2001 | Tatsumi ...................... 348/14.01 |
| 2010/0132004 A1 * | 5/2010 | Ota et al. ...................... 725/127 |
| 2013/0152149 A1 * | 6/2013 | Park et al. ...................... 725/114 |

* cited by examiner

*Primary Examiner* — Kris Rhu
(74) *Attorney, Agent, or Firm* — The Farrell Law Firm, P.C.

(57) ABSTRACT

An apparatus and method are provided for transmitting and receiving data in a data communication system. The method includes receiving certain multimedia data from a portable terminal using a first data communication scheme; transmitting the certain multimedia data to an external device; receiving control data corresponding to the certain multimedia data from the external device based on the first data communication scheme; converting the control data into a data format of a second data communication scheme; generating data including the converted control data; and transmitting the data to the portable terminal.

20 Claims, 6 Drawing Sheets

APPARATUS AND METHOD FOR TRANSMITTING AND RECEIVING DATA IN A DATA COMMUNICATION SYSTEM

PRIORITY

This application claims priority under 35 U.S.C. §119(a) to Korean Application Serial No. 10-2012-0141283, which was filed in the Korean Intellectual Property Office on Dec. 6, 2012, the entire content of which is hereby incorporated by reference.

BACKGROUND OF THE INVENTION

1. Field of the Invention

The present invention relates generally to a data communication system, and more particularly, to an apparatus and method for transmitting and receiving data in a data communication system.

2. Description of the Related Art

A portable terminal can provide a mirroring function, which is a function of transmitting multimedia data to an external device, e.g., a monitor or a television, using a High-Definition Multimedia Interface (HDMI) technique.

More specifically, to provide the mirroring function, an adapter is used to connect a portable terminal and an external device for communication. The adapter transmits multimedia data from the portable terminal to the external device, and receives and transmits Direct Digital Control (DDC) data for the multimedia data from the external device to the portable terminal. However, the adapter transmits the DDC data through a C-Bus line, which is very weak against mismatching of noise and impedance around the C-Bus line. Therefore, there is a problem in that the mismatching of noise and impedance causes packet loss of DDC data.

SUMMARY OF THE INVENTION

Accordingly, the present invention is designed to address at least the problems and/or disadvantages described above and to provide at least the advantages described below.

An aspect of the present invention is to provide an apparatus and method for transmitting and receiving data in a data communication system, which prevents errors in control data.

Another aspect of the present invention is to provide an apparatus and method for transmitting and receiving data in a data communication system, in which security of control data is increased by transmitting and receiving the control data through a Universal Serial Bus (USB).

In accordance with an aspect of the present invention, an apparatus for transmitting and receiving data in a portable terminal is provided. The apparatus includes a memory configured to store multimedia data; a data transmission and reception unit configured to transmit multimedia data to an adapter using a first data communication scheme; and a controller configured to identify a request to transmit certain multimedia data from among the stored multimedia data, transmit the certain multimedia data to the data transmission and reception unit based on the first data communication scheme, in response to the request, receive, from the adapter, data including a control data corresponding to the certain multimedia data, based on a second data communication scheme, extract the control data from the data, and identify a transmission state of the certain multimedia data based on the control data.

In accordance with another aspect of the present invention, an apparatus for transmitting and receiving data in an adapter is provided. The apparatus includes a data transmission and reception unit configured to receive certain multimedia data from a portable terminal by using a first data communication scheme, and transmit the certain multimedia data to an external device; and a controller configured to receive control data corresponding to the certain multimedia data from the external device based on the first data communication scheme, convert the control data into a data format of a second data communication scheme, generate data including the converted control data, and transmit the data to the portable terminal.

In accordance with another aspect of the present invention, a method of transmitting and receiving data by a portable terminal is provided. The method includes identifying a request to transmit certain multimedia data among stored multimedia data; transmitting the certain multimedia data to an adapter based on a first data communication scheme, in response to the request; receiving data including control data corresponding to the certain multimedia data, based on a second data communication scheme; extracting the control data from the data; and identifying a transmission state of the certain multimedia data based on the extracted control data.

In accordance with another aspect of the present invention, a method of transmitting and receiving data by an adapter is provided. The method includes receiving certain multimedia data from a portable terminal using a first data communication scheme; transmitting the certain multimedia data to an external device; receiving control data corresponding to the certain multimedia data from the external device based on the first data communication scheme; converting the control data into a data format of a second data communication scheme; generating data including the converted control data; and transmitting the data to the portable terminal.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the following description, a detailed description of known functions and configurations incorporated herein will be omitted when it may make the subject matter of the present invention rather unclear.

Herein, "portable terminals" refers to electronic devices that are easily carried by a user and movable, e.g., a video telephone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic Book (E-Book), portable computers (such as a notebook, a tablet, and the like), a digital camera, etc.

Figure 1:
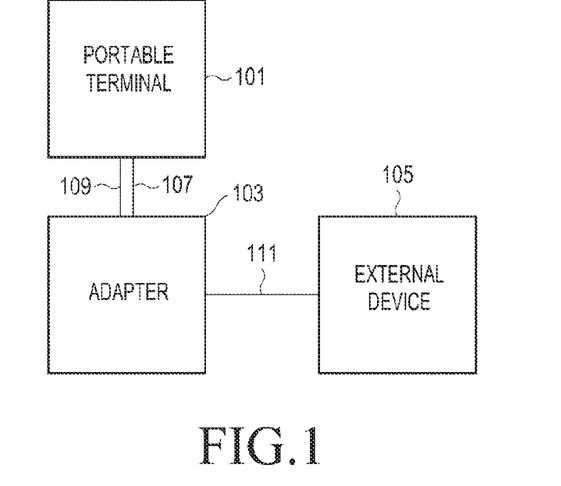
FIG. 1 is a block diagram illustrating a data communication system according to an embodiment of the present invention.

FIG. 1 is a block diagram illustrating a data communication system according to an embodiment of the present invention.

Referring to FIG. 1, the data communication system includes a portable terminal 101, an adapter 103 and an external device 105. For example, the external device 105 may be an Audio Visual (AV) device, a monitor, a digital television, etc.

The portable terminal 101, the adapter 103, and the external device 105 transmit and receive multimedia data by using a first data communication scheme. The first data communication scheme may be, e.g., HDMI. Further, the portable terminal 101 and the adapter 103 may be connected to each other through a USB port. Accordingly, the portable terminal 101 may transmit the multimedia data, to which the first data communication scheme is applied, to the adapter 103 through a line of the USB port. In addition, the portable terminal 101 may transmit and receive data, to which a USB communication scheme is applied, to/from the adapter 103 through the line of the USB port.

Herein, the external device 105 communicates with the adapter 103 using a first data communication scheme. For example, the first data communication scheme may be HDMI to which a Mobile High-Definition Link (MHL) technique is applied. HDMI is an uncompressed digital video and audio interface standard, which provides an interface between a multimedia source such as a set-top box or a Digital Versatile Disc (DVD) player, and a device such as an AV device, a monitor, or a digital television, which support HDMI. The MHL technique is a technology for outputting multimedia data received from the portable terminal 101 through a display of the external device 105. For example, the multimedia data may be moving picture data, game data, etc.

The external device 105 receives multimedia data through a line 111 from the adapter 103, analyzes the received multimedia data in order to generate control data, and transmits the control data to the adapter 103 through line 111. That is, the external device 105 receives the multimedia data frame by frame, identifies whether the received frames have errors, and transmits the control data including the identified result to the adapter 103. The control data relates to the multimedia data transmitted by the portable terminal 101, which includes an identifier of a frame in which an error is generated, a command for requesting a re-transmission of the frame in which the error is generated, a transmission rate of the multimedia data, etc. For example, if the first data communication scheme is HDMI using the MHL technique, the control data may be DDC data.

The adapter 103 communicates with the portable terminal 101 and the external device 105 using the first data communication scheme. The adapter 103 may be connected to the portable terminal 101 through a USB port. The adapter 103 receives multimedia data from the portable terminal 103 through a line 107 of the USB port, and transmits the received multimedia data through line 111 to the external device 105. Further, the adapter 103 receives the control data through line 111 from the external device 105, converts the received control data into a data format for a second data communication scheme, and transmits the data of the second data communication scheme to the portable terminal 101.

For example, the second data communication scheme may be a USB communication scheme. If the second data communication scheme is a USB communication scheme, the adapter 103 receives the control data and it generates USB data including the control data. Thereafter, the adapter 103 transmits the USB data to the portable terminal 101 through a line 109 of the USB port.

The portable terminal 101 transmits multimedia data to the adapter 103 using the first data communication scheme. The portable terminal 101 is connected to the adapter 103 through the USB port. Particularly, the portable terminal 101 transmits multimedia data to the adapter 103 through line 107 of the USB port using the first data communication scheme, receives the USB data through line 109 of the USB port using the second data communication scheme, and converts the received USB data into the control data. Thereafter, the portable terminal 101 identifies a transmission state of the multimedia data based on the control data.

Figure 2:
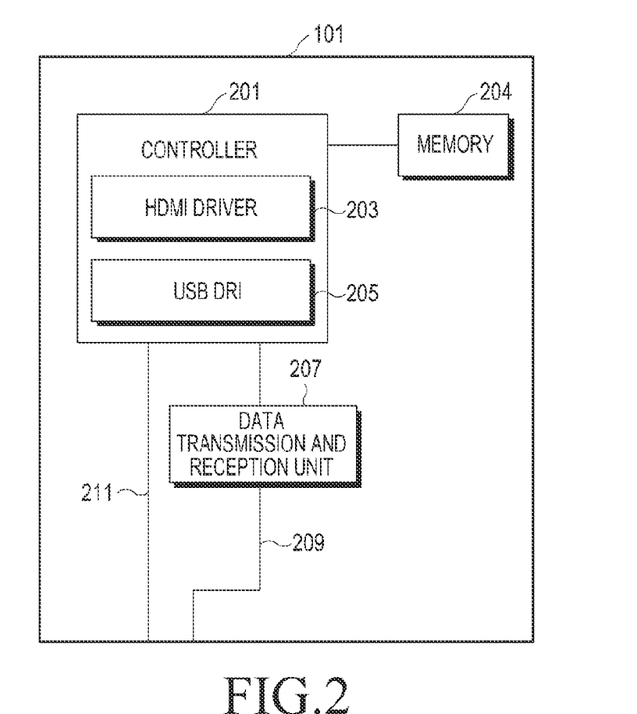
FIG. 2 is a block diagram illustrating a portable terminal according to an embodiment of the present invention.

FIG. 2 is a block diagram illustrating a portable terminal according to an embodiment of the present invention.

Referring to FIG. 2, the portable terminal 101 includes a controller 201 and a data transmission and reception unit 207. The data transmission and reception unit 207 receives multimedia data from a memory 204, under control of the controller 201, and transmits the received multimedia data to the adapter 103 through the line 209 and the line 107. Additionally, the data transmission and reception unit 207 receives HDMI data from a HDMI driver 203 of the controller 201, and converts the HDMI data into MHL data. Thereafter, the data transmission and reception unit 207 transmits the MHL data to the adapter 103 through the first line 107 of the USB port. The HDMI data includes Transition-Minimized Differential Signaling (TMDS) data and DDC data. The MHL data includes TMDS data and C-BUS data. For example, the TMDS data includes image data and audio data, and the DDC data or the C-BUS data includes control data. For example, the data transmission and reception unit 207 may be silicone image 9244 Low-power MHL transmitter.

The controller 201 controls the overall operation of the portable terminal 101.

The controller 201 may include a Central Processing Unit (CPU), a (Read Only Memory (ROM) in which control programs for control of the portable terminal 101 are stored, and a Random Access Memory (RAM) that stores signals or data input from the outside of the portable terminal 101, or is used as a memory area for operations performed in the portable terminal 101. The CPU may include a single core, a dual core, a triple core, a quad core, or five or more cores. The CPU, the ROM, and the RAM may be connected with each other through an internal bus.

Particularly, the controller 201 includes the HDMI driver 203 and a USB driver 205. Here, the USB driver 205 receives the USB data including the control data of the multimedia data through the USB port, detects the control data from the received USB data, and transmits the detected control data to the HDMI driver 203. The USB data is transmitted from the adapter 130 to the USB driver 205 through the line 109 of the USB port and the line 211.

The HDMI driver 203 identifies whether a user selects multimedia data, which is transmitted to the external device 105, among multimedia data stored in the memory 204. When a multimedia data is selected by the user, the HDMI driver 203 converts the selected multimedia data into the HDMI data, based on an HDMI technique, and transmits the HDMI data to the data transmission and reception unit 207.

The HDMI driver 203 receives the control data for the multimedia data transmitted from the first USB driver 205, and identifies a transmission state for the multimedia data, based on the received control data. The HDMI driver 203 transmits the multimedia data, based on the identified transmission state. For example, when the control data includes information indicating that an error is generated in a certain frame of the multimedia data, the HDMI driver 203 may retransmit the certain frame.

When the portable terminal 101 and the adapter 103 are connected through the USB port 307, a line 211 is connected with a line 109 while a line 209 is connected to a line 107.

Figure 3:
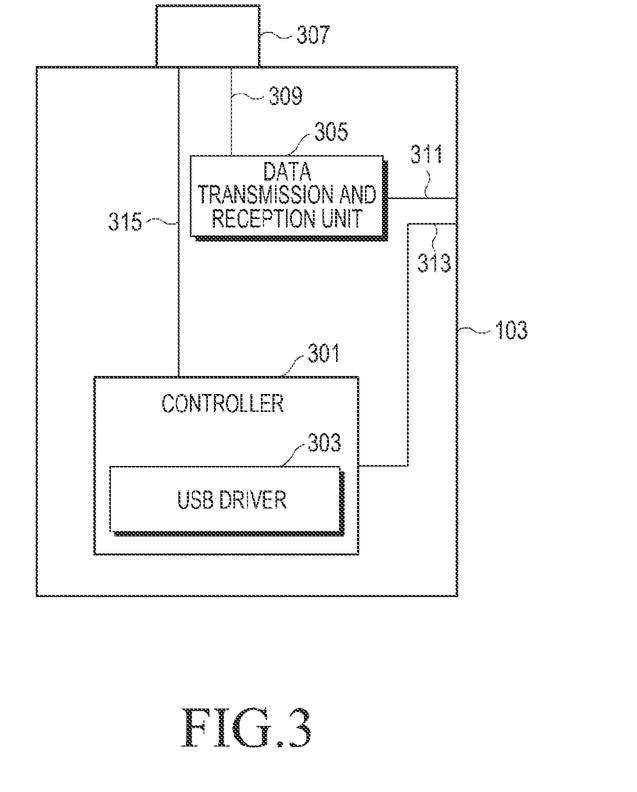
FIG. 3 is a block diagram illustrating an adapter according to an embodiment of the present invention.

FIG. 3 is a block diagram illustrating an adapter according to an embodiment of the present invention.

Referring to FIG. 3, the adapter 103 includes a controller 301, a data transmission and reception unit 305, and a USB port 307. For example, the controller 301 may be microprocessor and the transmission and reception unit 305 may be silicone image 9292 Low-power MHL transmitter. The data transmission and reception unit 305 receives multimedia data from the portable terminal 101 through a line 309, and transmits the multimedia data to the external device 105 through a line 311. The data transmission and reception unit 305 converts the MHL data into the HDMI data, and transmits the HDMI data to the external device 105 through an HDMI cable.

The controller 301 controls the overall operation of the adapter 103. Particularly, the controller 301 includes a USB driver 303 that receives control data for multimedia data that is transmitted through line 313. Further, the USB driver 303 converts the control data into the USB data using a USB data format, and transmits the converted USB data to the portable terminal 101 through a line 315.

The USB driver 303 converts the control data into the USB data format by allocating the control data to a body of the USB data according to USB data types.

For example, the USB data type can be classified into a control endpoint, an interrupt endpoint, an isochronous endpoint, and a bulk endpoint. The control endpoint type is used mainly for setting a device or transmitting data for the identification of a device state, and can transmit and receive data simultaneously. That is, the control endpoint type transmits a certain command to a device, and receives a result for a command.

The interrupt endpoint type is used mainly for transmitting data in a Human Interface Device (HID) device such as a mouse and a keyboard.

The isochronous endpoint type is similar to the interrupt endpoint type, and is used for unconditionally transmitting data, regardless of whether an error is generated in the data to be transmitted.

The bulk endpoint type is used for transmitting a mass data and performs data error detection and data recovery during the transmission of the data.

Because the control data is feedback data for multimedia data transmitted by the portable terminal 101, the USB driver 303 may transmit the control data to the portable terminal 101, upon receiving the control data. Therefore, the USB driver 303 transmits the control data using the control endpoint type, the interrupt endpoint type, or the isochronous endpoint type. For example, the USB driver 303 allocates the control data to the body of the USB data based on the isochronous endpoint type, and transmits the control data.

Figure 4:
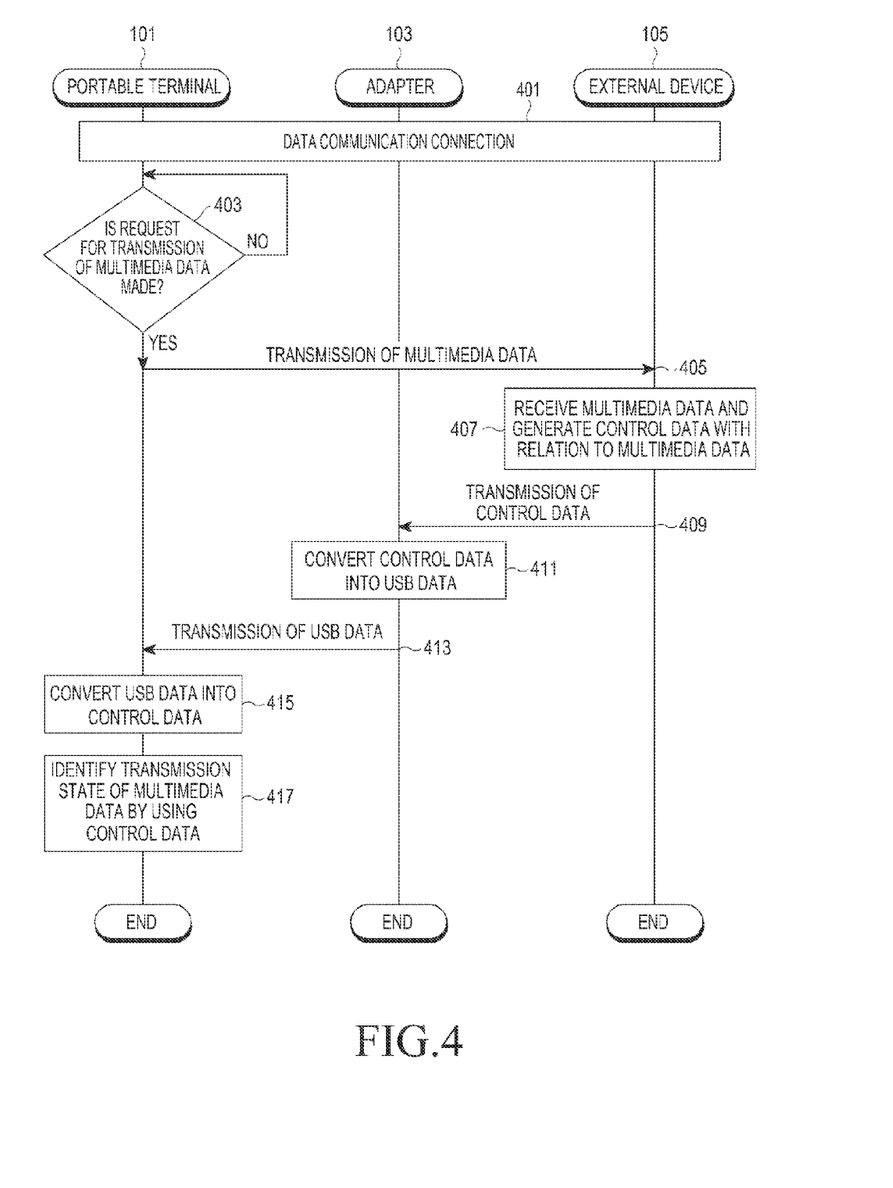
FIG. 4 is a flowchart illustrating a method for transmitting and receiving data in a data communication system according to an embodiment of the present invention.

FIG. 4 is a flowchart illustrating a method for transmitting and receiving data in a data communication system according to an embodiment of the present invention.

Referring to FIG. 4, in step 401, the portable terminal 101 is connected for data communication with the external device 105 through the adapter 103, using the first data communication scheme. For example, the first data communication scheme is an HDMI scheme to which an MHL technique is applied. At this time, the portable terminal 101 is connected to the adapter 103 through the USB port, and the adapter 103 is connected to the external device 105 through an HDMI cable.

In step 403, the portable terminal 101 identifies whether a user makes a request to transmit multimedia data. If the request is made by the user, the portable terminal 101 displays one or more identifiers (for example, a file name of multimedia data) corresponding to stored multimedia data. When the user selects any one of the identifiers displayed on the portable terminal 101, the portable terminal 101 transmits the multimedia data corresponding to the selected identifier to the external device 105 through the adapter 103 using the first data communication scheme in step 405. The portable terminal 101 transmits the multimedia data to the adapter 103 through the USB port 307, frame by frame, and the adapter 101 transmits the multimedia data, frame by frame, to the external device 105 through the HDMI cable.

In step 407, the external device 105 receives the multimedia data transmitted, frame by frame, and generates control data relating to the received multimedia data. In step 409, the external device 105 transmits the control data to the adapter 103. More specifically, the external device 105 identifies whether an error exists in the multimedia data received frame by frame. If an error exists, the external device 105 generates control data including an identifier of the frame with the error and a command for requesting the portable terminal 101 to retransmit the frame. Further, the control data may include a transmission rate of the multimedia data. Thereafter, the external device 105 transmits the control data to the adapter 103 through the HDMI cable.

In step 411, the adapter 103 converts the received control data into USB data using a USB data format. More specifically, the adapter 130 allocates the control data to the body of the USB data in order to generate the USB data including the control data.

In step 413, the adapter 103 transmits the USB data to the portable terminal 101 through the USB port.

In step 415, the portable terminal 101 converts the received USB data into the control data by emulating the received USB data. Specifically, the portable terminal 101 extracts the control data from the body of the received USB data.

In step 417, the portable terminal 101 identifies a transmission state of the multimedia data using the control data. When the control data includes a request for retransmission of a certain frame and an identifier of the certain frame, the portable terminal 101 retransmits the frame of the multimedia data corresponding to the identifier.

Figure 5:
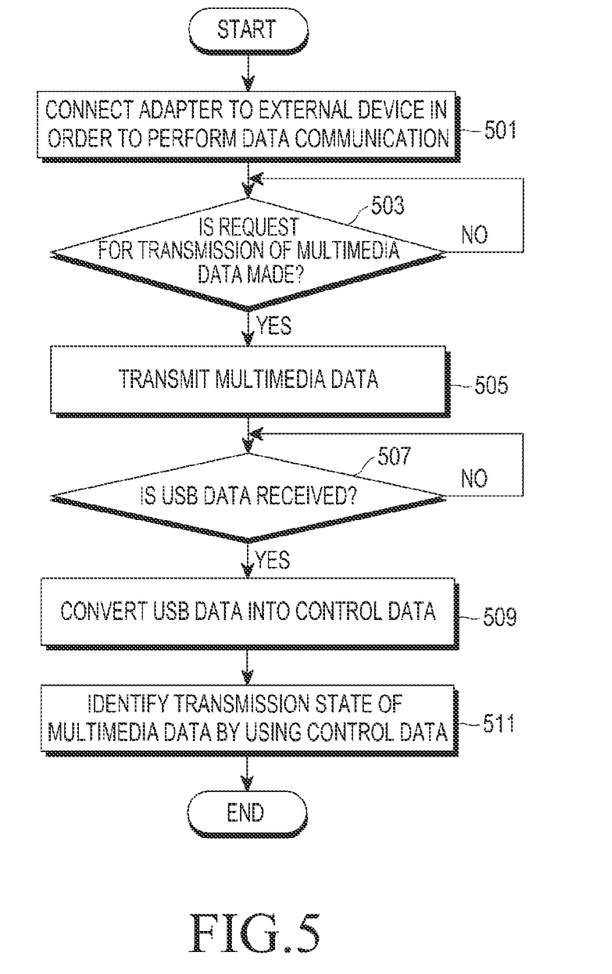
FIG. 5 is a flowchart illustrating a method for transmitting and receiving data by a portable terminal according to an embodiment of the present invention.

FIG. 5 is a flowchart illustrating a method for transmitting and receiving data in a portable terminal according to an embodiment of the present invention.

Referring to FIG. 5, in step 501, the portable terminal 101 connects for a data communication with the external device 105 through the adapter 103 using a first data communication scheme. As described above, the first data communication scheme may be an HDMI scheme to which an MHL technique is applied. For example, the portable terminal 101 connects with the adapter 103 through a USB port.

In step 503, the portable terminal 101 determines whether a user has requested to transmit multimedia data. If the request is made by the user, the portable terminal 101 displays one or more identifiers (for example, file name of multimedia data) corresponding to stored multimedia data. When the user selects one of the one or more displayed identifiers, the portable terminal 101 transmits multimedia data corresponding to the selected identifier to the external device 105 through the adapter 10 using the first data communication scheme. The portable terminal 101 transmits the multimedia data to the adapter 103 through the USB port, frame by frame.

In step 507, the portable terminal 101 determines whether the USB data is received from the adapter 103 through the USB port. Here, the USB data includes control data that is related to the multimedia data transmitted by the portable terminal 101 and includes an identifier for a frame with an error, a request to retransmit the identified frame, and a transmission rate of the multimedia data.

If the USB data is received, the portable terminal 101 emulates and converts the received USB data into a control data in step 509. Specifically, the portable terminal 101 extracts the control data from a body of the USB data.

In step 511, the portable terminal 101 identifies the transmission state of the multimedia data using the control data. When the control data includes a request to retransmit a certain frame and an identifier for the certain frame, the portable terminal 101 retransmits the frame of the multimedia data corresponding to the identifier of the certain frame.

Figure 6:
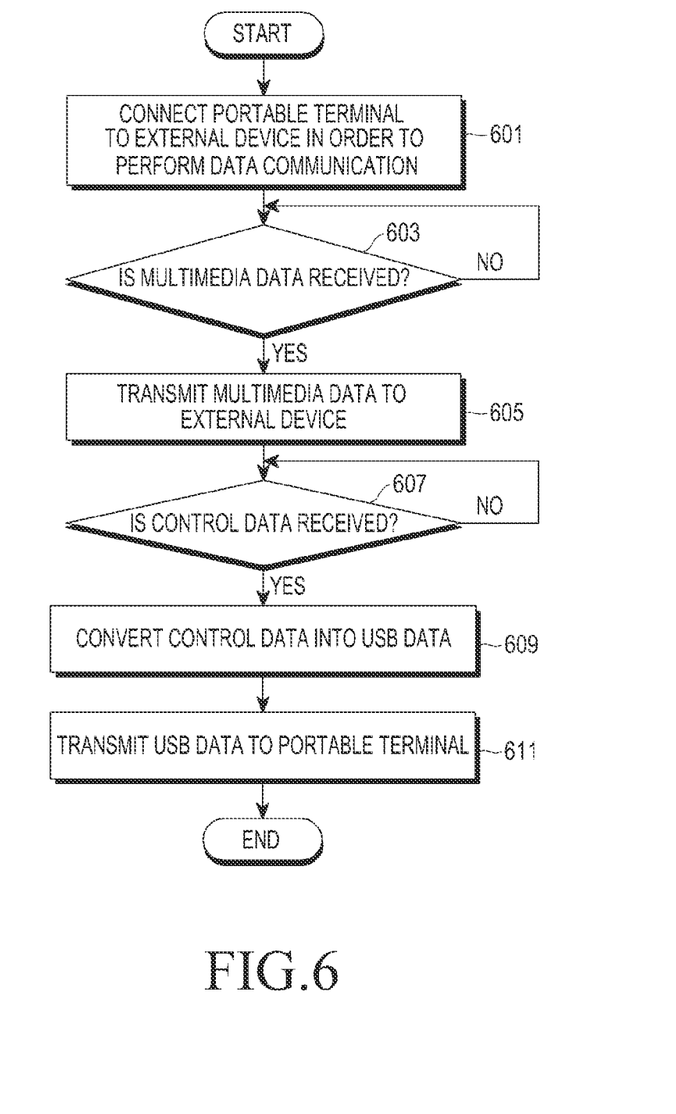
FIG. 6 is a flowchart illustrating a method for transmitting and receiving data by an adapter according to an embodiment of the present invention.

FIG. 6 is a flowchart illustrating a method for transmitting and receiving data in an adapter according to an embodiment of the present invention.

Referring to FIG. 6, in step 601, the adapter 103 connects the portable terminal 101 to the external device 105, in order to perform data communication using the first data communication scheme. Again, the first data communication scheme may be an HDMI scheme to which an MHL technique is applied. The adapter 103 is connected to the portable terminal 101 through a USB port and to the external device 105 through an HDMI cable.

In step 603, the adapter 103 determines whether the multimedia data is received, from the portable terminal 101, frame by frame, through the USB port. When the multimedia data is received, in step 605, the adapter 103 transmits the received multimedia data, frame by frame, to the external device 105, using the first data communication scheme. The adapter 103 transmits the multimedia data through the HDMI cable.

In step 607, the adapter 103 determines whether control data for the multimedia data is received from the external device 105. Here, the control data is related to the multimedia data transmitted by the portable terminal 101, and includes an identifier of a frame with an error, a request to retransmit the frame, and a transmission rate of the multimedia data. When the control data is received, the adapter 103 converts the received control data into the USB data using the USB data format in step 609. Specifically, the adapter 103 allocates the control data to the body of the USB data in order to generate the USB data including the control data.

In step 611, the adapter 103 transmits the USB data to the portable terminal 101 through the USB port.

Figure 7:
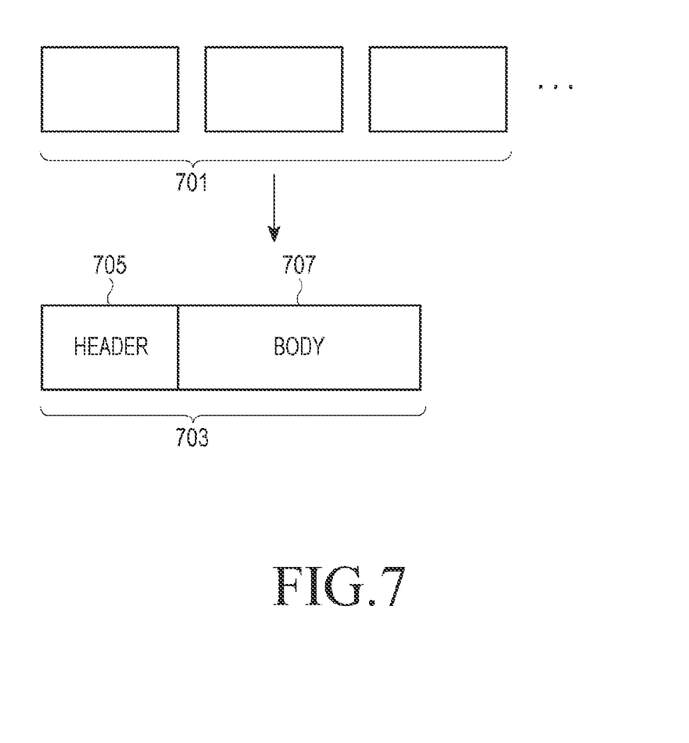
FIG. 7 illustrates USB data in an adapter according to an embodiment of the present invention.

FIG. 7 illustrates USB data in an adapter according to an embodiment of the present invention.

Referring to FIG. 7, packets 701 of the control data and a format of the USB data are illustrated. The USB data 703 includes a header 705 and a body 707.

The adapter 103 allocates the packets 701 of the control data to the body 707 of the USB data 703, and transmits the USB data 703, to which the packets 701 of the control data are allocated, to the portable terminal 101. The portable terminal 101 receives the USB data 703 to which the packets 701 of the control data are allocated, and extracts the packets 701 of the control data from the body 707 of the USB data 703. Thereafter, the portable terminal 101 identifies a transmission state of the multimedia data, based on the packets 701 of the extracted control data.

In an apparatus and method for transmitting and receiving data in a data communication system according to any of the above-described embodiments of the present invention, integrity of the control data is ensured because the control data is transmitted and received through the USB line. Further, because the USB line is a protocol line, it is possible to secure reliability and integrity of a data transmission.

The above-described embodiments of the present invention may also be implemented in the form of hardware, or a combination of hardware and software. Any such software may be stored in a volatile or non-volatile storage device such as a Read-Only Memory (ROM), or in a memory such as a Random Access Memory (RAM), a memory chip, a memory device or a memory integrated circuit, or in a storage medium, such as a Compact Disc (CD), a DVD, a magnetic disk or a magnetic tape, which is optically or magnetically recordable and simultaneously is readable by a machine (for example, a computer), regardless of whether the software can be deleted or rewritten. Further, embodiments of the present invention may be implemented in the form of carrier wave (for example, transmission through internet). Additionally, the storage medium which is readable by a computer may be distributed and stored in computer systems connected through networks in the form of codes which is readable by computers.

Although control data is transmitted from the external device 105 to the portable terminal 101 in the above-described embodiments of the present invention, the control data may also be transmitted from the portable terminal 101 to the external device 105. For example, the portable terminal 101 can generate the control data relating to a configuration of the external device 105, convert the generated control data into the USB data, and transmit the converted data to the adapter 103. The adapter 103 can extract the control data from the USB data, and transmit the extracted control data to the external device 105.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An apparatus for transmitting and receiving data in a portable terminal, the apparatus comprising:
   a memory configured to store multimedia data;
   a data transmission and reception unit configured to transmit multimedia data to an adapter using a first data communication scheme; and
   a controller configured to identify a request to transmit certain multimedia data from among the stored multimedia data, transmit the certain multimedia data to the adapter through the data transmission and reception unit based on the first data communication scheme, in response to the request, receive, from the adapter, data including a control data corresponding to the certain multimedia data, based on a second data communication scheme, extract the control data from the received data, and identify a transmission state of the certain multimedia data based on the control data,
   wherein the control data includes information associated with a transmission error of the certain multimedia.

2. The apparatus of claim 1, wherein the first data communication scheme includes a High-Definition Multimedia Interface (HDMI) communication scheme to which a Mobile High-Definition Link (MHL) technique is applied.

3. The apparatus of claim 1, wherein the second data communication scheme includes a Universal Serial Bus (USB) communication scheme.

4. The apparatus of claim 1, wherein the control data includes an identifier of a frame of the certain multimedia data, a request to retransmit the frame, and a transmission rate of the certain multimedia data.

5. The apparatus of claim 1, wherein the control data includes Direct Digital Control (DDC) data.

6. An apparatus for transmitting and receiving data in an adapter, the apparatus comprising:
  a data transmission and reception unit configured to receive certain multimedia data from a portable terminal by using a first data communication scheme, and transmit the certain multimedia data to an external device; and
  a controller configured to receive control data corresponding to the certain multimedia data from the external device based on the first data communication scheme, convert the control data into a data format of a second data communication scheme, generate data including the converted control data, and transmit the data to the portable terminal.

7. The apparatus of claim 6, wherein the first data communication scheme includes a High-Definition Multimedia Interface (HDMI) communication scheme to which a Mobile High-Definition Link (MHL) technique is applied.

8. The apparatus of claim 6, wherein the second data communication scheme includes a Universal Serial Bus (USB) communication scheme.

9. The apparatus of claim 6, wherein the control data includes an identifier of a frame of the certain multimedia data, a request to retransmit the frame, and a transmission rate of the certain multimedia data.

10. The apparatus of claim 6, wherein the control data includes Direct Digital Control (DDC) data.

11. A method for transmitting and receiving data by a portable terminal, the method comprising:
  identifying a request to transmit certain multimedia data among stored multimedia data;
  transmitting the certain multimedia data to an adapter based on a first data communication scheme, in response to the request;
  receiving data including control data corresponding to the certain multimedia data, based on a second data communication scheme;
  extracting the control data from the received data; and
  identifying a transmission state of the certain multimedia data based on the extracted control data,
  wherein the control data includes information associated with a transmission error of the certain multimedia.

12. The method of claim 11, wherein the first data communication scheme includes a High-Definition Multimedia Interface (HDMI) communication scheme to which a Mobile High-Definition Link (MHL) technique is applied.

13. The method of claim 11, wherein the second data communication scheme includes a Universal Serial Bus (USB) communication scheme.

14. The method of claim 11, wherein the control data includes an identifier of a frame of the certain multimedia data, a request to retransmit the frame, and a transmission rate of the certain multimedia data.

15. The method of claim 11, wherein the control data includes Direct Digital Control (DDC) data.

16. A method for transmitting and receiving data by an adapter, the method comprising:
  receiving certain multimedia data from a portable terminal using a first data communication scheme;
  transmitting the certain multimedia data to an external device;
  receiving control data corresponding to the certain multimedia data from the external device based on the first data communication scheme;
  converting the control data into a data format of a second data communication scheme;
  generating data including the converted control data; and
  transmitting the data to the portable terminal.

17. The method of claim 16, wherein the first data communication scheme includes a High-Definition Multimedia Interface (HDMI) communication scheme to which a Mobile High-Definition Link (MHL) technique is applied.

18. The method of claim 16, wherein the second data communication scheme includes a Universal Serial Bus (USB) communication scheme.

19. The method of claim 16, wherein the control data includes an identifier of a frame of the certain multimedia data, a request to retransmit the frame, and a transmission rate of the certain multimedia data.

20. The method of claim 16, wherein the control data includes Direct Digital Control (DDC) data.

* * * * *